United States Patent
Scharp et al.

(10) Patent No.: US 8,943,687 B2
(45) Date of Patent: Feb. 3, 2015

(54) METHOD FOR THE PRODUCTION OF A PISTON FOR AN INTERNAL COMBUSTION ENGINE

(75) Inventors: Rainer Scharp, Vaihingen (DE); Gerhard Berr, Aspach (DE); Sascha-Oliver Boczek, Dielheim (DE); Reiner Mueller, Rottweil (DE)

(73) Assignee: MAHLE International GmbH, Stuttgart (DE)

( * ) Notice: Subject to any disclaimer, the term of this patent is extended or adjusted under 35 U.S.C. 154(b) by 920 days.

(21) Appl. No.: 13/066,559

(22) Filed: Apr. 18, 2011

(65) Prior Publication Data
US 2012/0222305 A1   Sep. 6, 2012

(30) Foreign Application Priority Data
Mar. 4, 2011   (DE) .......................... 10 2011 013 141

(51) Int. Cl.
*B23P 15/10*   (2006.01)
*B23K 20/18*   (2006.01)
*B22D 19/00*   (2006.01)
*B23P 11/00*   (2006.01)
*B21K 1/18*   (2006.01)
*F02F 3/00*   (2006.01)

(52) U.S. Cl.
CPC ................. *B21K 1/185* (2013.01); *F02F 3/003* (2013.01)
USPC .............. 29/888.043; 29/888.04; 29/888.042; 29/888.044; 29/888.047; 29/888.049; 123/193.6; 92/186

(58) Field of Classification Search
CPC .......... B23P 15/10; B21K 1/185; F02F 3/003; F02F 3/16; F02F 3/22; F01P 3/06; F01P 3/10
USPC ......... 29/888.042, 888.04, 888.043, 888.044, 29/888.045, 888.047, 888.049; 123/193.6; 92/186

See application file for complete search history.

(56) References Cited

U.S. PATENT DOCUMENTS

| | | | |
|---|---|---|---|
| 2,273,986 A * | 2/1942 | Pickett ............................ | 92/176 |
| 4,581,983 A | 4/1986 | Moebus | |
| 5,778,846 A | 7/1998 | Mielke | |
| 6,026,777 A | 2/2000 | Kemnitz et al. | |
| 7,341,037 B2 * | 3/2008 | Parker et al. ................ | 123/193.6 |
| 8,528,206 B2 * | 9/2013 | Scharp et al. ............ | 29/888.047 |
| 8,631,572 B2 * | 1/2014 | Seifried et al. ............. | 29/888.04 |
| 2012/0080004 A1 * | 4/2012 | Menezes et al. ........... | 123/193.6 |
| 2012/0260882 A1 * | 10/2012 | Martins et al. ............. | 123/193.6 |

FOREIGN PATENT DOCUMENTS

| | | |
|---|---|---|
| DE | 29 19 638 | 11/1980 |
| DE | 195 01 416 | 7/1996 |
| DE | 196 03 589 | 8/1997 |
| DE | 198 46 152 | 4/2000 |

* cited by examiner

*Primary Examiner* — Sarang Afzali
(74) *Attorney, Agent, or Firm* — Collard & Roe, P.C.

(57) ABSTRACT

A method for the production of a piston made of steel, for an internal combustion engine, in which the upper piston part is produced using the forging method, and the lower piston part is produced using the forging or casting method, and they are subsequently welded to one another. To simplify the production method and make it cheaper, the upper piston part is forged using the method of hot forming and of cold calibration, to finish it to such an extent that further processing of the combustion bowl and of the upper cooling channel regions can be eliminated.

4 Claims, 5 Drawing Sheets

METHOD FOR THE PRODUCTION OF A PISTON FOR AN INTERNAL COMBUSTION ENGINE

CROSS REFERENCE TO RELATED APPLICATIONS

Applicants claim priority under 35 U.S.C. §119 of German Application No. 10 2011 013 141.8 filed on Mar. 4, 2011, the disclosure of which is incorporated by reference.

BACKGROUND OF THE INVENTION

1. Field of the Invention

The invention relates to a method for the production of a piston for an internal combustion engine, in accordance with the preamble of claim 1.

2. The Prior Art

From the state of the art, it is generally known to produce pistons from steel for an internal combustion engine, in that first an upper piston part is produced using the forging method, and a lower piston part is produced using the forging method or by means of casting, and then the upper piston part is welded to the lower piston part. In this regard, reference should be made to the patent documents DE 195 01 416 A1, DE-OS 29 19 638, DE 196 03 589 A1, and DE 198 46 152 A1. In this connection, the method of hot forming, in other words hot forging, at a steel temperature of 950° C. to 1300° C., is used.

In this connection, an uncontrollable oxide layer forms on the surface of the forged blank, and in order to remove it, the surface of the forged blank must be blasted with coarse blasting material. This results in great variations in the forged contour, so that as a consequence of this, complicated reworking of the forged blank, by means of a chip-cutting processing method, is required.

SUMMARY OF THE INVENTION

Accordingly, it is the task of the present invention to avoid the aforementioned disadvantages of the state of the art, whereby in particular, complicated reworking of the combustion bowl and of the cooling channel is supposed to be avoided.

It is furthermore the task of the present invention to indicate a method with which pistons having combustion chamber bowls and cooling channels that are not configured with rotation symmetry or in centered manner can be produced in cost-advantageous manner.

Finally, it is the task of the present invention to indicate a method with which pistons can be produced, in which the wall between the edge of the combustion bowl and the upper part of the cooling channel has a constant thickness over the circumference.

These tasks are accomplished with the characteristics that stand in the characterizing part of the main claim and of the dependent claims. Advantageous embodiments of the invention are the object of the dependent claims.

In this connection, the result is achieved, by means of cold calibration or cold forming of the forged blank, that the combustion bowl and the cooling channel are formed in finished manner.

BRIEF DESCRIPTION OF THE DRAWINGS

Some exemplary embodiments of the invention will be explained in the following, using the drawings. These show.

DETAILED DESCRIPTION OF THE PREFERRED EMBODIMENTS

Figure 1:
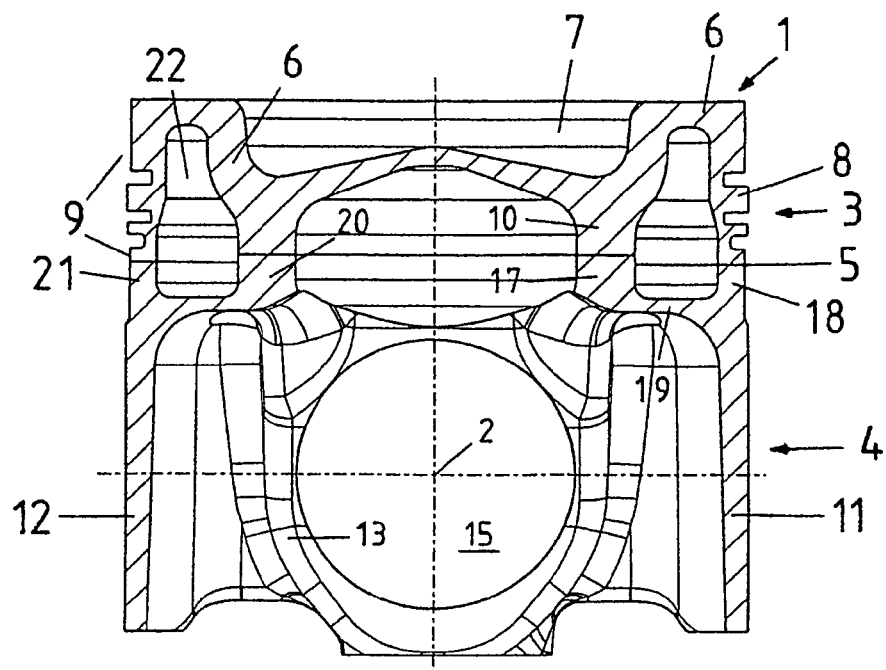
FIG. 1 a sectional diagram of a piston produced according to the method according to the invention, in a section plane that lies perpendicular to the pin bore axis, FIG. 2 a section through the piston, in a section plane that lies on the pin bore axis, FIG. 3 a section through the upper piston part after semi-hot forming, FIG. 4 a section through the upper piston part after over-lathing of the outer contour and of the contact regions intended for friction welding, FIG. 5 a top view of a configuration of the upper piston part having an asymmetrically configured and eccentrically disposed combustion bowl, FIG. 6 a section through the upper piston part along the line VI-VI in FIG. 5, FIG. 7 the upper piston part and the lower piston part before joining by means of friction welding, FIG. 8 a top view of another embodiment of the upper piston part having an asymmetrically configured and eccentrically disposed combustion bowl and having a valve niche, and FIG. 9 a section through the upper piston part along the line IX-IX in FIG. 8.

FIG. 1 shows an embodiment of a piston 1 produced according to the method according to the invention, in section, perpendicular to the pin axis 2, consisting of an upper piston part 3 and a lower piston part 4, which are connected with one another by way of a friction-welding seam 5.

The piston 1 has a piston crown 6 into which a combustion bowl 7 is formed. Radially on the outside, a ring wall 8 directed downward, having a ring belt 9 for piston rings not shown in the figure, is formed onto the piston crown 6. Radially within the ring wall 8, the piston 1 has a ring-shaped support 10 formed onto the underside of the piston crown 6.

The lower piston part 4 consists of two skirt elements 11 and 12 that lie opposite one another, which are connected with one another by way of two pin bosses 13 and 14 that lie opposite one another, each having a pin bore 15 and 16. In FIG. 1, only the pin boss 13 having the pin bore 15 can be seen, because of the position of the section plane.

A ring-shaped contact part 17 connected with the pin bosses 13, 14 is disposed on the top of the lower piston part 4. Furthermore, the lower piston part 4 has a circumferential ring rib 18 on its top, which rib is disposed radially outside of the contact part 17 and connected with the skirt elements 11, 12. A radially oriented ring element 19 extends between the contact part 17 and the ring rib 18.

In this connection, the support 10 and the contact part 17 are disposed in such a manner that the underside of the support 10 and the top of the contact part 17 have contact with one another and form a first contact region 20. Furthermore, the ring wall 8 and the ring rib 18 are disposed in such a manner that the lower face side of the ring wall 8 and the top of the ring rib 18 also have contact with one another and form a second contact region 21. The first and the second contact region 20 and 21 form friction-welding surfaces during the production of the piston 1.

In this way, the result is achieved that a circumferential cooling channel 22 disposed close to the piston crown 6, radially on the outside, is delimited, at the top, by the piston crown 6, radially on the inside partly by the piston crown 6, partly by the support 10, and partly by the contact part 17, at the bottom by the ring element 19, and radially on the outside partly by the ring wall 8 and partly by the ring rib 18. The cooling channel 22 has an inflow opening for introduction of cooling oil and an outflow opening for discharge of cooling oil, but these are not shown in the figure.

Figure 2:
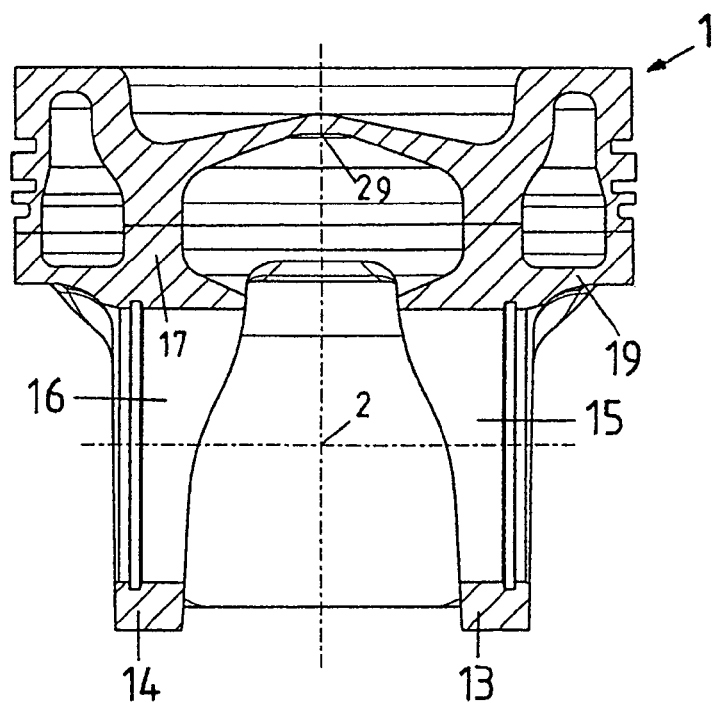

In FIG. 2, the piston 1 is shown in section along the pin bore axis 2. Here, the two pin bosses 13, 14 can be seen, with the contact part 17 formed onto them, as can the ring element 19 that is connected with the contact part 17 and the pin bosses 13, 14, respectively.

The piston 1 is produced from AFP steel, in other words from precipitation-hardened ferritic-pearlitic steel, such as case-hardened steel 38MnVS6, for example. However, any other suitable steel can be used, such as tempered steel 42CrMo4, for example. In this connection, production of the lower piston part 4 takes place in conventional manner, by means of casting or hot forging.

The upper piston part 3 is produced by means of the method of hot forming. In this connection, a piece of AFP steel that is shaped to fit into the drop-forging machine intended for the upper piston part 3 is heated to 1200° C. to 1300° C., and subsequently formed or pre-formed in multiple forming stages, in other words forging processes, in the same drop-forging machine. The scale that forms during forging is removed by means of blasting.

Subsequently, the finished forged upper part blank is cold-calibrated at room temperature, whereby all the surfaces of the upper piston part 3 are pressed at room temperature, in order to achieve the final dimensions.

Alternatively to this, the pre-formed upper part blank can also be brought into its final shape by means of cold-forming at room temperature. It is advantageous, in this case, if an annealing process is still carried out before blasting, in order to reduce the tendency to form cracks during cold forming.

Furthermore, other processes can also be used for production of the pre-form, such as the method of cold forming, of semi-hot forming, or of milling, for example. Thus, the pre-form can also be produced by means of a precision casting method. In order to avoid scale formation, the latter method should be used under an inert gas atmosphere.

Figure 3:
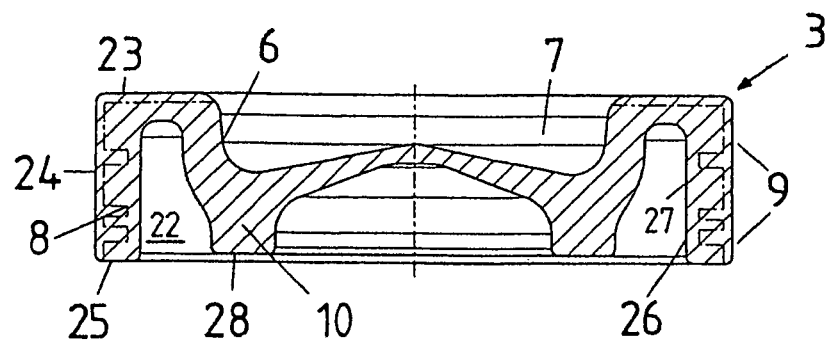

The resulting blank of the upper piston part 3 is shown in FIG. 3. In this connection, the combustion bowl 7, the upper cooling channel region, and the inner mandrel region 29 are already formed in their final form, so that no further processing steps are any longer required in these regions. In this connection, the result is also achieved that the wall thickness between the bowl edge and the upper cooling channel region is almost constant over the circumference. The upper piston part 3 as it looks after finishing is shown in FIG. 3 with broken lines.

Figure 4:
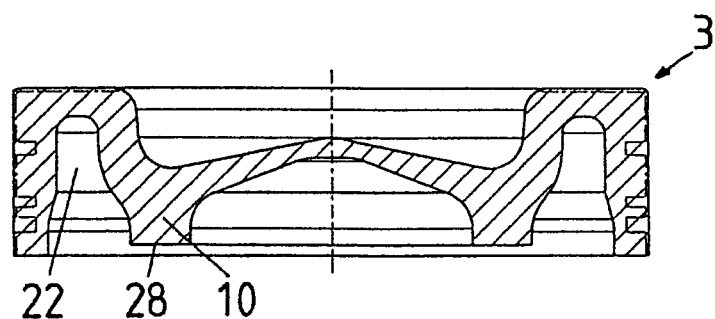

In the subsequent method step, the radially outer region 23 of the piston crown 6, the radially outer region 24 of the upper piston part 3 intended for the ring belt 9, the lower face surface 25 of the ring wall 8, the lower region 26 of the inner surface 27 of the ring wall 8, and the contact surface 28 of the support 10 are machined by means of lathing, so that the upper piston part 3 as shown in FIG. 4 is obtained. The lower region of the cooling channel 22, the lower face surface 25 of the ring wall 8, and the contact surface 28 of the support 10 are formed in finished form after this latter method step. Here again, the upper piston part 3, as it looks after finishing, is shown with broken lines.

Figure 5:
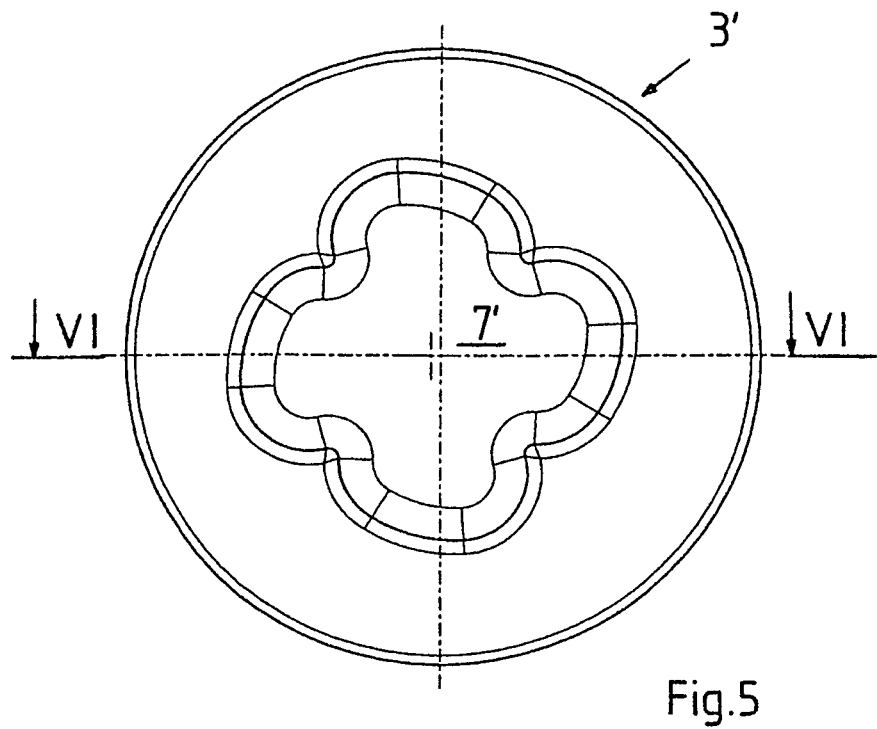
Figure 6:
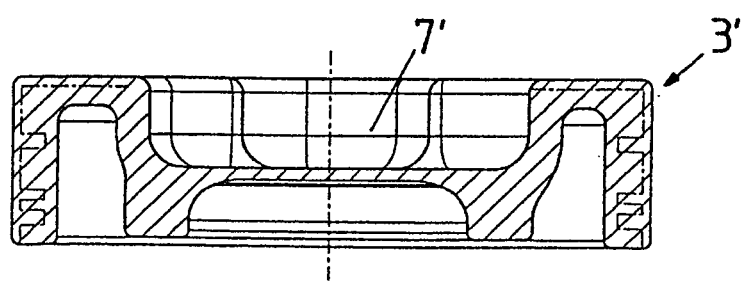

The production method of hot forming in combination with cold calibration or cold forming, respectively, particularly allows production of upper piston parts 3' having combustion bowls 7' that are configured asymmetrically and disposed eccentrically, as shown in FIGS. 5 and 6. Here, again, no further processing of the combustion bowl 7' is required any longer, once the process of hot forming and of cold calibration or cold forming, respectively, of the upper piston part 3' has been completed.

In the present exemplary embodiment according to FIGS. 5 and 6, the combustion bowl 7' has approximately the shape of a four-leafed clover. However, any desired shape of a combustion bowl can be implemented with the method of hot forming in combination with cold calibration or cold forming, respectively.

Figure 8:
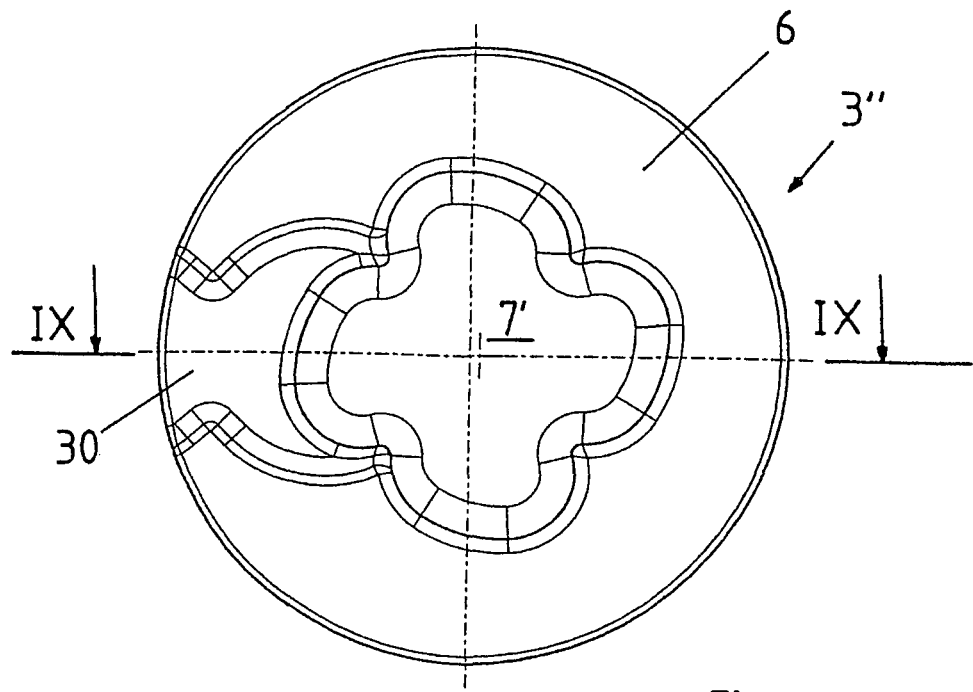
Figure 9:
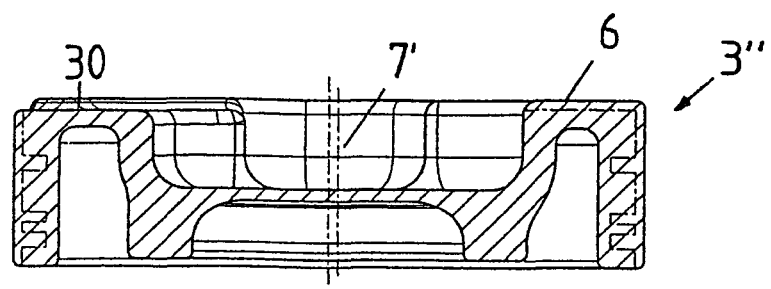

FIGS. 8 and 9 show the upper piston part according to FIGS. 5 and 6, produced in this manner, whereby in addition, a valve niche 30 has been formed into the piston crown 6 of the upper piston part 3".

Figure 7:
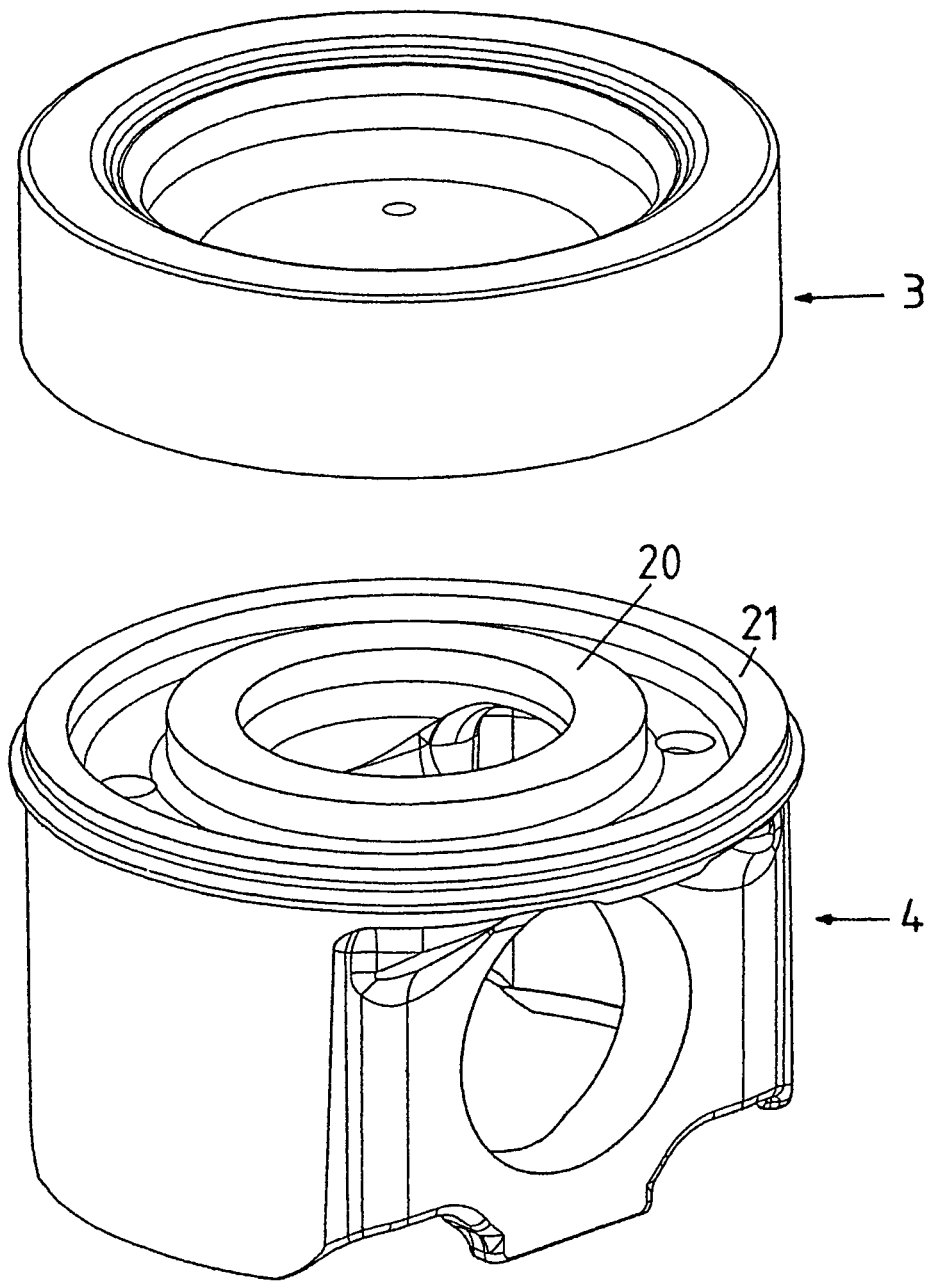

The upper piston part 3, 3', 3" according to FIG. 4, 5, 6, 8, is braced into a friction-welding device (not shown in the figure) together with the lower piston part 4, and, as shown in FIG. 7, they are brought into position, relative to one another, so that they can be put into rotation, moved toward one another with force, and friction-welded to one another when the upper piston part 3, 3', 3" makes contact with the lower piston part 4 in the region of the contact regions 20 and 21. If the combustion bowl 7' is configured asymmetrically or eccentrically, care must be taken during friction welding to ensure that after completion of the welding process, the combustion bowl 7' assumes a clearly defined rotation position relative to the pin axis 2, for example.

In this connection, the piston 1 shown in FIGS. 1 and 2 is obtained.

Within the scope of the last method step, the grooves of the ring belt 9 are lathed into the outer piston wall and the piston crown 6 is lathed flat, as indicated in FIGS. 3 and 4. Furthermore, the precision piston contour and the pin bores are worked in.

Reference Symbol List
1 piston
2 pin axis
3, 3', 3" upper piston part
4 lower piston part
5 friction-welding seam
6 piston crown
7, 7' combustion bowl
8 ring wall
9 ring belt
10 support
11, 12 switch element
13, 14 pin boss
15, 16 pin bore
17 contact part
18 ring rib
19 ring element
20 first contact region
21 second contact region
22 cooling channel
23 outer region of piston crown 6
24 outer region of upper piston part
25 lower face surface of ring wall 8
26 lower region of inner surface 27 of ring wall 8
27 inner surface of ring wall 8
28 contact surface of support 10
29 inner mandrel region
30 valve niche

The invention claimed is:
1. A method for producing a piston for an internal combustion engine, comprising the following method steps:
producing an upper piston part made of steel by forging, the upper piston part having a piston crown with a combustion bowl, a ring wall formed onto the piston crown radially on an outside, directed downward, and a ring-shaped support disposed radially within the ring wall formed onto an underside of the piston crown, wherein an upper part of a cooling channel is formed between the ring wall and the support, producing a lower piston part made of steel by forging or casting, the lower piston part having two skirt elements that lie opposite one another and which are connected with one another by two pin bosses that lie opposite one another, a ring-shaped contact part disposed on a top of the lower piston part and connected with the pin boss, and a circumferential ring rib disposed radially outside of the contact part and connected with the skirt elements, wherein a lower part of the cooling channel is formed between the contact part and the ring rib, welding the upper piston part to the lower piston part at contact surfaces of the ring wall and the ring rib, and at contact surfaces of the support and the contact part, respectively, so that the cooling channel formed by the upper piston part and by the lower piston part is closed, and finishing of the piston using a chip-cutting production method, wherein during the step of producing the upper piston part, an upper piston part blank is forged using a hot-forming method, at 1200° C. to 1300° C., after which the upper piston part blank is cold-calibrated, after which the combustion bowl and/or the upper part of the cooling channel undergo no further processing, and subsequently a radially outer region of the piston crown, a radially outer region of the ring wall, a lower region of an inner surface of the ring wall, and the contact surface of the support of the upper piston blank are finished to produce the upper piston part.

2. The method according to claim 1, wherein the upper piston part is forged with a constant thickness in a region of the piston crown between a bowl edge of the combustion bowl and the cooling channel.

3. The method according to claim 1, wherein the combustion bowl is asymmetrically configured and eccentrically disposed.

4. The method according to claim 1, wherein at least one valve niche is formed into the upper piston part.

* * * * *